United States Patent [19]

Kawamoto

[11] Patent Number: 4,731,626
[45] Date of Patent: Mar. 15, 1988

[54] DIAPHRAGM DEVICE FOR CAMERA
[75] Inventor: Kenichi Kawamoto, Tokyo, Japan
[73] Assignee: Canon Kabushiki Kaisha, Tokyo, Japan
[21] Appl. No.: 51,327
[22] Filed: May 19, 1987
[30] Foreign Application Priority Data
May 21, 1986 [JP] Japan .................. 61-076740[U]
[51] Int. Cl.⁴ .............................. G03B 9/02
[52] U.S. Cl. ........................ 354/271.1; 354/274
[58] Field of Search .............. 354/271.1, 274, 226, 354/228, 231, 233, 270, 452

[56] References Cited
U.S. PATENT DOCUMENTS
4,470,679  9/1984  Starp ........................... 354/274
4,601,564  7/1986  Yamamoto .................. 354/271.1

Primary Examiner—L. T. Hix
Assistant Examiner—David M. Gray
Attorney, Agent, or Firm—Fitzpatrick, Cella, Harper & Scinto

[57] ABSTRACT

The present invention is directed to a diaphragm device and, more particularly, to a device for adjusting a position of a guide groove connected to a diaphragm blade to control movement of the diaphragm blade, thereby adjusting a diaphragm opening. The present invention provides a diaphragm device including means for adjusting said diaphragm opening in which a position of a guide groove for defining a reduced opening state of the diaphragm is movable about a pivot axis corresponding to a position of the guide groove where the diaphragm is in full open state, thereby adjusting the opening characteristic at the side of the reduced opening state.

5 Claims, 6 Drawing Figures

F I G. 3 (a)
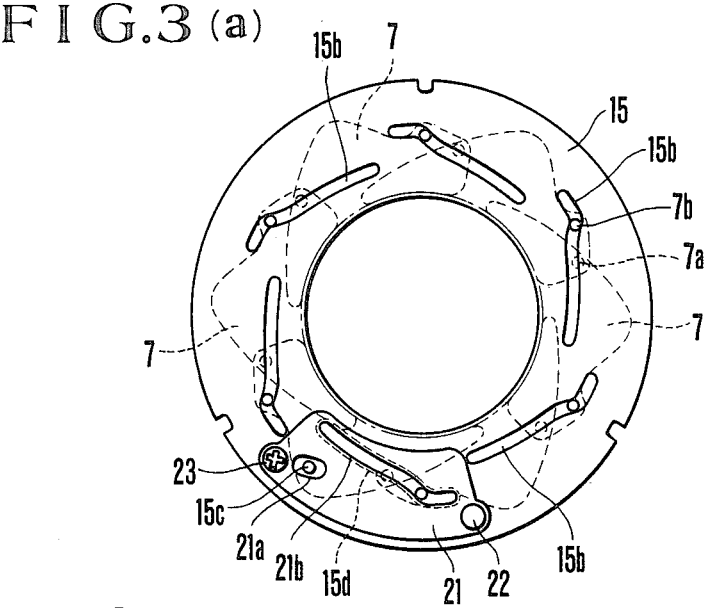
F I G. 3 (b)
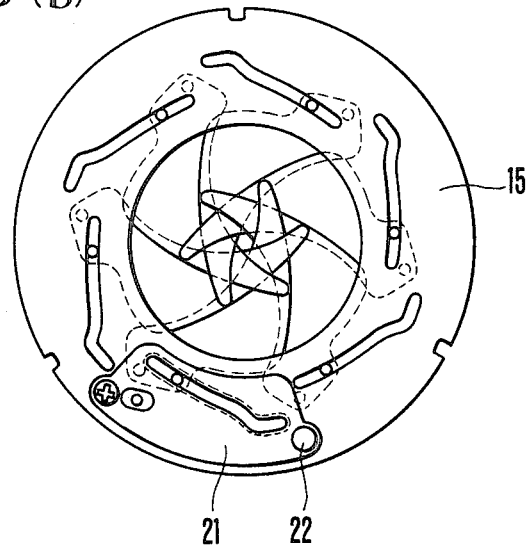

F I G. 3 (c)
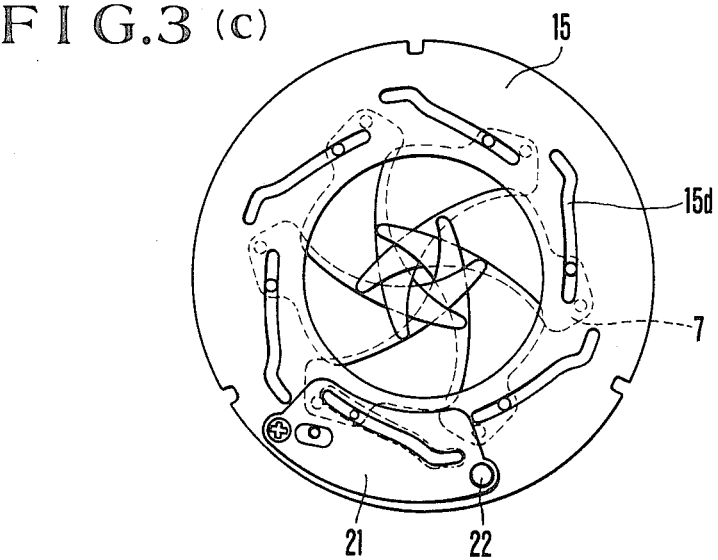
F I G. 3 (d)
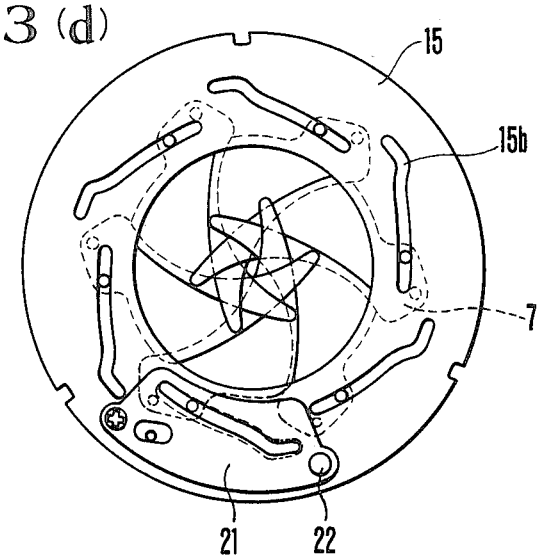

DIAPHRAGM DEVICE FOR CAMERA

BACKGROUND OF THE INVENTION

1. Field of the Invention

The present invention relates to a diaphragm device for a camera and, more particularly, to a diaphragm device having high precision which is suitable for use in a still video camera.

2. Description of the Related Art

In a diaphragm device for a camera, it has been a general practice to adjust an opening diameter when the diaphragm is in its full open state. The conventional diaphragm device is so constructed that the adjustment of the opening diameter is not effected or cannot be effected when the diaphragm is in its reduced opening state. On the other hand, the diaphragm device involves various manufacturing errors (for example, error in shape of diaphragm cam groove, error in position of dowel formed on diaphragm blade, error in position of hole formed in diaphragm rotating ring, etc.), and these errors become larger as the diameter of the diaphragm opening becomes smaller. This is the reason why the number of steps of the diaphragm is not proportional to a quantity of light passing through the diaphragm at the reduced opening side. The error caused at the reduced opening side appears in the usual 35 mm film camera but such error has not presented a severe problem in case of the 35 mm film camera. This is because a photographed picture has a relatively large area and, consequently, the diaphragm opening is relatively large, so that an error is not likely to occur and further because an allowance of illumination of the image plane on the film (in other words, latitude) is relatively large.

In case of a still video camera, however, the state of things is completely different from that of the 35 mm film camera. An image pickup element of the still video camera, which corresponds to the film, has a considerably smaller size than that of the picture of a 35 mm film camera. Since the ratio of focal distances of lenses having the same angle of view is proportional to that of sizes of diagonals of picture planes, an opening diameter of a diaphragm of the still video camera having smaller focal distance is smaller than that of the 35 mm film camera even if they have a same F-number. Accordingly the error at the reduced opening diameter of the diaphragm becomes larger. Furthermore, there is such disadvantage that the image pickup element has a narrower latitude than that of the silver-halide film, so that more precise illumination of an image plane is required in case of the image pickup element. Accordingly, the conventional diaphragm device has a limited performance particularly when it is in a reduced opening state.

SUMMARY OF THE INVENTION

One aspect of the present invention resides in solving the above-mentioned problem of the conventional diaphragm device, and the essential feature thereof is to reduce the above-mentioned error in the reduced opening state to zero by forming at least one diaphragm blade in adjustable form.

In accordance with one aspect of the present invention there is provided a diaphragm device which comprises diaphragm blades, a diaphragm actuating ring having cam grooves arranged to control opening and closing of the diaphragm blades, and a cam member arranged to control opening and closing of one of the diaphragm blades independently of the above-mentioned cam grooves, said cam member being disposed to be displaceable about a point on its opening side thereby adjusting effective diameter of the diaphragm.

The other objects of the present invention will be understood from an embodiment of the present invention which will be described with reference to accompanying drawings.

BRIEF DESCRIPTION OF THE DRAWINGS

FIG. 3(a) is a plan view showing the opened state of the diaphragm unit according to the present invention.

FIG. 3(b) is a plan view showing the reduced opening state of the same.

FIGS. 3(c) and 3(d) illustrate the compensation of the opening diameter in the reduced opening state.

DETAILED DESCRIPTION OF THE PREFERRED EMBODIMENT

Now, the invention will be described with reference to the drawings.

Figure 1:
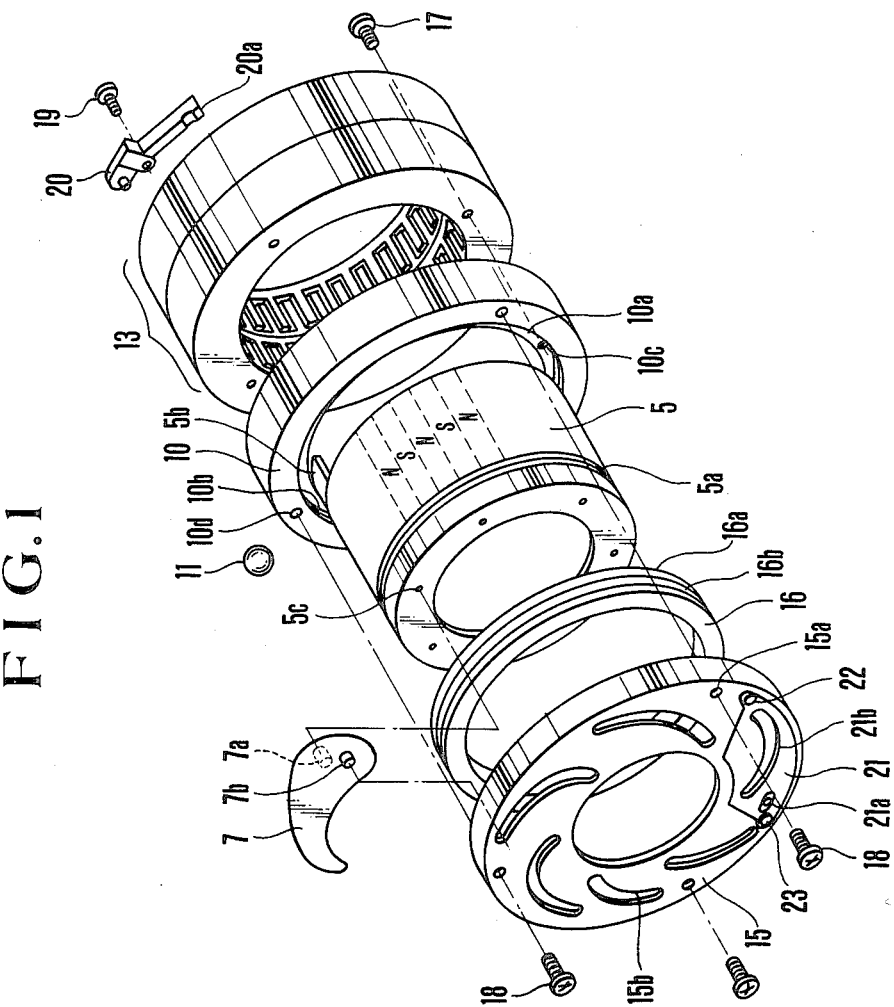
FIG. 1 is an exploded perspective view showing the diaphragm unit according to the present invention.
Figure 2:
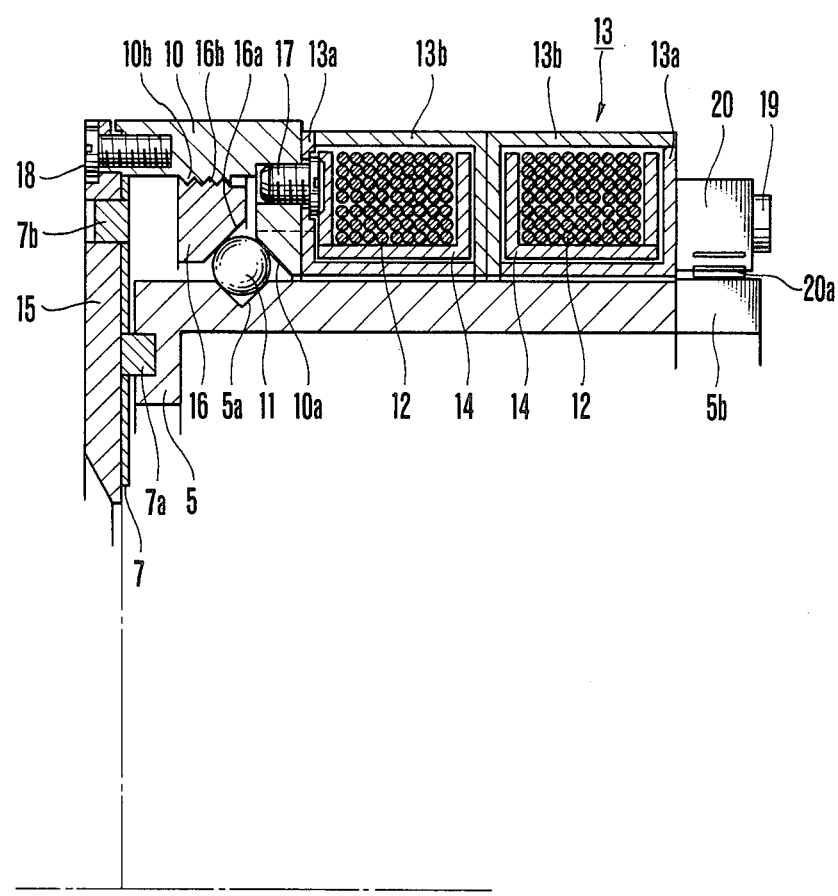
FIG. 2 is a sectional view showing the diaphragm unit according to the present invention.

FIG. 1 and 2 illustrate an embodiment of the diaphragm unit which is arranged to be driven by a permanent magnet type stepping motor. This diaphragm unit includes a rotor 5 which is magnetized in a peripheral direction. Said rotor 5 includes a guide groove 5a (or guide hole) formed in its outer peripheral surface or its extended surface for guiding a ball 11, a projection 5b which is arranged to turn on or off a diaphragm opening signal switch and holes 5c for receiving dowels 7a formed on diaphragm blades 7. The guide groove 5a and the holes 5c are preferably formed by integral forming process, if the rotor 5 is made of material which can be formed by injection molding. In the illustrated embodiment, however, the holes 5c are formed by the integral forming process but the guide groove 5a is formed by after-machining process. Diaphragm blades 7 have dowels 7a and 7b formed on both sides thereof, and the dowels 7a fit in holes 5c formed in the rotor 5, while the dowels 7b fit in diaphragm cam grooves 15b formed in a blade actuating ring 15. A ball race 10 is formed with a tapered surface 10a for receiving balls 11, a screw thread 10b arranged to engage with a screw thread 16b of a cap ring 16, threaded holes 10c arranged to receive set screws 17 for fixing a yoke 13 onto the ball race 10, and threaded holes 10d arranged to receive set screws 18 for fixing said actuating ring 15 onto the ball race 10. The balls 11 are disposed between the tapered surface 10a of the ball race 10, a tapered surface 16a of the cap ring 16 and the guide groove 5a of the rotor 5, thereby constituting a ball bearing. This ball bearing serves to hold a minute air gap between the rotor 5 and the yoke 13 under the action of centering effect thereof and to assure smooth rotating movement of the rotor 5. It is desirable to select the materials of the rotor 5 and the balls 11 so that the surface hardness of the former is substantially the same as the surface hardness of the latter. For example, when the rotor 5 is made of a plastic magnet, which has a surface of 60–130 Rockwell hardness, it is preferable to form the ball 11 by plastic material having similar hardness. In the embodiment of the present invention a polyacetal resin having self-lubricating property was used as the materials of the rotor and the balls. It is, however, possible to apply chemical nickel plating to the rotor 5 to obtain the surface hardness of Vickers hardness 300-500 and in this case it is possible to use a suitable material other than the plastics.

The yoke 13 has bobbins 14 disposed therein and coils 12 are wound around the bobbins. The yoke 13 consists of two interconnected combinations of annular yoke portions 13a and 13b which have a plurality of axial teeth on their inside surfaces and it is fixed onto the ball race 10 in coaxial relation thereto by means of set screws 17. The bobbins 14 are arranged to prevent the coils 12 from direct contact with the yoke 13. The blade actuating ring 15 has diaphragm cam grooves 15b which are arranged to receive the dowels 7b formed on the diaphragm blades 7 and said ring is fixed onto the ball race 10 by means of the set screws 18. The cap ring 16 has the tapered surface 16a arranged to receive the balls 11 and the screw thread 16d formed on the periphery thereof which is arranged to engage with the screw thread 10b of the ball race 10.

A diaphragm opening signal switch 20 is fixed to the yoke 13 by means of a set screw 19 and said switch 20 has a contact piece 20a which is pressed in upward direction by the projection 5b of the rotor 5, thereby turning on the switch, when the diaphragm is in its opened position.

In the above construction, the teeth formed on the yoke portion 13a has different polarity from those formed on the yoke portion 13b, so that these teeth and the rotor 5 constitute a magnetic path, whereby a stable position of the rotor is determined and this stable position is successively displaced depending upon the variation of the exciting conditions of the coils 12 while the rotor 5 is rotated. The diaphragm blades 7 are driven by the rotation of the rotor 5. The rotor 5 is, of course, so arranged that the opening rate of the diaphragm corresponds to the stepping angle of the rotor and in the construction according to the present invention the rotor 5 is so magnetized that the angular phase of magnetization in peripheral direction of the rotor 5 corresponds to the angular phase of the hole 5c which receives the dowel 7a of the diaphragm blade.

In the illustrated embodiment, the motor is constructed by the two-phase permanent magnet-type stepping motor. However, the motor may be of a single-phase type, a variable reluctance type or a composite type. A DC motor may be used to obtain the same effect.

FIGS. 3(a)-3(d) are plan views of the diaphragm device according to the present invention. Referring to these drawings, the diaphragm blade actuating ring 15 includes the diaphragm cam grooves 15b which receive the dowels 7b of the diaphragm blades 7. A diaphragm adjusting plate 21 is disposed on the blade actuating ring 15 and it is pivotally mounted, at its one end, on the blade actuating ring 15 by means of a pin 22 which is fixed by caulking on said blade actuating ring 15. Said plate 21 is fixed, at its other end, by means of a set screw 23 onto the ring 15 after adjustment has been effected as hereinafter described. The diaphragm adjusting plate 21 has a cam groove 21b formed therein, which is of same shape as that of the diaphragm cam groove 15d of the actuating ring 15. The diaphragm actuating plate 21 is formed with an adjusting slot 21a, which cooperates with an adjusting standard hole 15c formed in the actuating ring 15 to effect the adjustment of the diaphragm.

FIG. 3(a) illustrates the opened state of the diaphragm and FIG. 3(b) illustrates the reduced opening state of the diaphragm where the diaphragm adjusting plate 21 is in its neutral position.

Now the method of effecting the adjustment of the diaphragm will be described.

The diaphragm unit including the driving motor is mounted on a measuring instrument for measuring quantity of light. The diaphragm is driven by the motor to its minimum opening position and adjustment is effected so that the quantity of light measured by the instrument becomes equal to a reference quantity. The adjustment is made by using a special tool. This special tool consists of a rod having a stepped eccentric part. In use, the forward end of said rod is engaged with the adjusting standard hole 15c, while the outer diameter of the same is engaged in the minor diameter of the adjusting slot 21a. If the tool is rotated, the diaphragm adjusting plate 21 is swung in an outward or an inward direction, whereby the diaphragm cam groove 21b is displaced, so that only one diaphragm blade is displaced to vary the effective diameter at the time of the reduced opening state of the diaphragm. At this time, the pin 22, which forms the pivot point of the diaphragm adjusting plate 21, is disposed at the side of the opening end of the diaphragm groove 21b, so that the opening diameter at the larger diameter side is not changed while only the opening diameter at the reduced diameter side is adjusted. Such adjustment corresponds to the tendency of the error of the reduced opening of the diaphragm increasing in a simple manner toward its minimum opening side, that is very advantageous in practical use. The cam groove 15d of the actuating ring 15 positioned underside of the diaphragm cam groove 21b of the adjusting plate 21 has a wider width than that of the cam groove 21b, so that the former does not adversely effect the guiding action of the dowel 7b. FIG. 3(c) shows the opening reduced state where the quantity of light has been increased by swinging the diaphragm adjusting plate 21 in the outward direction. FIG. 3(d) shows the same state where the quantity of light has been decreased by swinging the diaphragm adjusting plate 21 in the inward direction.

It will be understood that the present invention provides a diaphragm device having high precision in which one of the diaphragm blades is made in adjustable form whereby it is possible to reduce the error in the reduced opening state to zero. Although it has been described that the present invention is suitable for use in the still video camera, it will be understood that the present invention is not limited to the use in the still video camera but to be adaptable to the use in the fields where a highly precise diaphragm device is required, including a usual still camera, a lens-exchangeable type video camera or the like.

What is claimed is:
1. A diaphragm device, comprising,
  (a) a plurality of diaphragm blades which cooperate to form a diaphragm opening;
  (b) a diaphragm controlling member having a plurality of guide grooves connected to respective ones of the diaphragm blades and arranged to control movements of the respective diaphragm blades to vary the diaphragm opening within a range from its full open state to its reduced opening state having a predetermined opening value; and
  (c) an adjusting member for movably adjusting at least one of said guide grooves, said adjusting member being arranged to displace said guide groove so that the position of the diaphragm blade in the reduced opening state having the predetermined opening value is moved for a larger amount than that of the position of the diaphragm blade in the full open state.

2. A diaphragm device according to claim 1, in which:

said diaphragm blade includes a connecting member movably connected to said guide groove, which is movable within a range from a first position to a second position on a locus defined by the guide groove, and said diaphragm blade makes such movement that the diaphragm is in its full open state when the connecting member is located at said first position and is changed to its reduced opening state as the connecting member is moved from said first position to said second position, said adjusting member being arranged to move the guide groove so as to move the part of the guide groove located toward the second position about a pivot axis corresponding to the part of the guide groove located toward the first position.

3. A diaphragm device according to claim 2, in which:

said adjusting member includes a guide groove and it is arranged on the diaphragm controlling member so as to be movable about a pivot axis corresponding to the part thereof located toward said first position.

4. A diaphragm device according to claim 3, in which:

said adjusting member is so arranged that said one of said guide grooves formed on said diaphragm controlling member and the guide groove of the adjusting member overlap each other and the guide groove on the diaphragm controlling member is larger than the guide groove of the adjusting member.

5. A diaphragm device, comprising:
(a) a plurality of diaphragm blades which cooperate to form a diaphragm opening;
(b) a diaphragm controlling member having a plurality of guide grooves connected to respective ones of the diaphragm blades and arranged to control movements of the respective diaphragm blades to vary the diaphragm opening within a range from its full open state to its reduced opening state having a predetermined opening value; and
(c) an adjusting member,
said member having a guide groove,
said adjusting member being so disposed that one of said guide grooves of said diaphragm controlling member and the guide groove of the adjusting member overlap each other,
said adjusting member being arranged to be swingable relative to the diaphragm controlling member about a predetermined point, whereby the movement of the diaphragm blade connected to the guide groove of said adjusting member is adjusted and controlled independently of the other diaphragm blades.

* * * * *